US009643568B2

United States Patent
Jayasuriya et al.

(10) Patent No.: US 9,643,568 B2
(45) Date of Patent: May 9, 2017

(54) SEAT BELT RETRACTOR INCLUDING PRETENSIONER AND SLACK REMOVER

(71) Applicant: Ford Global Technologies, LLC, Dearborn, MI (US)

(72) Inventors: Mangala A. Jayasuriya, Bloomfield Hills, MI (US); Parakrama V. Weerappuli, West Bloomfield, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 179 days.

(21) Appl. No.: 14/560,145

(22) Filed: Dec. 4, 2014

(65) Prior Publication Data

US 2016/0159319 A1    Jun. 9, 2016

(51) Int. Cl.
*B60R 22/40* (2006.01)
*B60R 22/36* (2006.01)
*B60R 22/347* (2006.01)

(52) U.S. Cl.
CPC ............ *B60R 22/36* (2013.01); *B60R 22/347* (2013.01); *B60R 2022/3475* (2013.01)

(58) Field of Classification Search
CPC ......... B60R 22/40; B60R 22/42; B60R 22/36; B60R 22/347
See application file for complete search history.

(56) References Cited

U.S. PATENT DOCUMENTS

| 3,576,056 | A | | 4/1971 | Barcus |
| 4,176,808 | A | | 12/1979 | Sasaki et al. |
| 4,378,915 | A | * | 4/1983 | Fohl ................. B60R 22/42 242/381.4 |
| 4,667,893 | A | | 5/1987 | Fohl |
| 5,088,160 | A | | 2/1992 | Warrick |
| 5,485,970 | A | | 1/1996 | Steffens, Jr. |
| 7,137,481 | B2 | | 11/2006 | Petzl et al. |
| 8,678,440 | B1 | * | 3/2014 | Kohlndorfer ....... B60R 22/4633 242/374 |
| 2014/0033485 | A1 | | 2/2014 | Kingery |

FOREIGN PATENT DOCUMENTS

| DE | 3236507 | 4/1984 |
| DE | 4314176 | 11/1994 |
| DE | 102005048245 | 4/2007 |

* cited by examiner

*Primary Examiner* — Sang Kim
(74) *Attorney, Agent, or Firm* — Frank A. MacKenzie; Bejin Bieneman PLC

(57) ABSTRACT

A seat belt retractor includes a housing and a spool supported by the housing. Webbing is wound around the spool. A webbing engagement member is supported by the housing and is movable to a locked position engaged with the webbing for preventing movement of the webbing relative to webbing engagement member. An activating device is slideably supported by the housing and is slideably engageable with the webbing engagement member for moving the webbing locking device to the locked position. In the locked position, the webbing locking device prevents the webbing from being fed from the spool, thus preventing any slack in the webbing on the spool from being fed out when the webbing locking device is in the locked position.

20 Claims, 8 Drawing Sheets

SEAT BELT RETRACTOR INCLUDING PRETENSIONER AND SLACK REMOVER

BACKGROUND

A seat belt assembly is mounted in a vehicle for restraining an occupant in a seat of the vehicle during a sudden deceleration of the vehicle, e.g., during a vehicle impact. The seat belt assembly includes a retractor having a rotatable spool with a webbing wrapped about the spool. The webbing is extendable from the spool, i.e., by rotating the spool, to allow the webbing to be extended across the occupant and engaged with a buckle via a clip on the webbing. The spool is spring-loaded to bias the webbing toward the retractor to pull the webbing against the occupant when the clip is engaged with the buckle and to retract the webbing onto the spool when the clip is disengaged with the buckle.

The retractor may include a pretensioner that is activated to rotate the spool to retract the webbing during a sudden deceleration of the vehicle, such as when a vehicle impact is sensed, to reduce or eliminate slack in the webbing and pull the webbing toward the occupant. The vehicle may include an impact sensing system that senses impact of the vehicle, and the impact sensing system may be in communication with the pretensioner to instruct the pretensioner to activate when impact of the vehicle is sensed. As the pretensioner causes the spool to retract the webbing, the webbing pulls the occupant against the seat. This positions the occupant for interaction with inflating front airbags and reduces the likelihood that the occupant slides forward under the webbing, i.e., reduces the likelihood of "submarining."

However, during normal operating conditions of the vehicle, retraction of the webbing onto the spool may create slack in the webbing on the spool. During an impact of the vehicle, forward momentum of the occupant pulls this slack of the webbing from the spool. The slack of the webbing on the spool counteracts the pretensioner. As such, there remains an opportunity to design a retractor that reduces the counteraction of the pretension by slack in the webbing on the spool.

DETAILED DESCRIPTION

Figure 1:
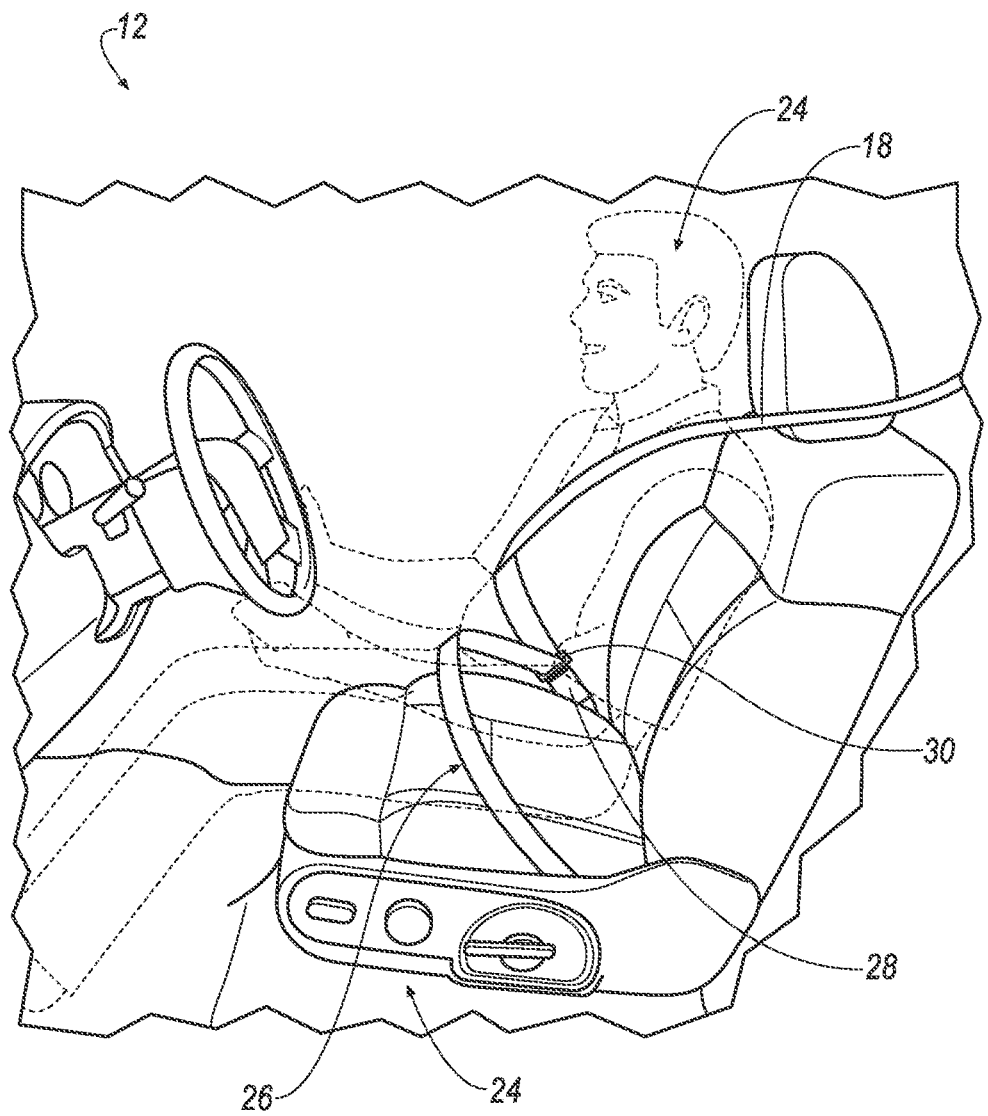
FIG. 1 is a perspective view of a portion of an interior of a vehicle.
Figure 2:
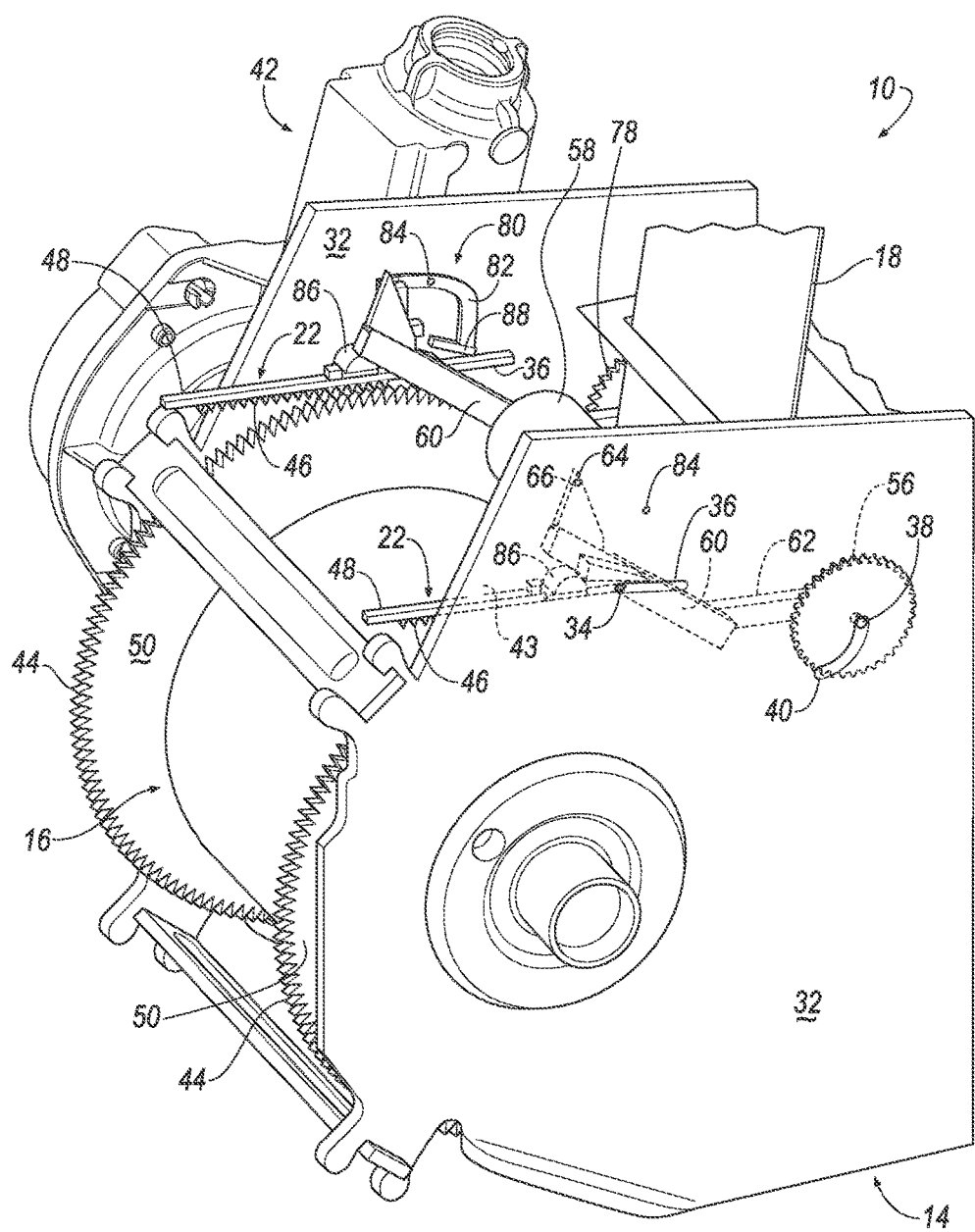
FIG. 2 is a perspective view of a seat belt retractor including a spool supported by a housing.

With reference to the Figures, wherein like numerals indicate like parts throughout the several views, a seat belt retractor 10 may be mounted in a vehicle 12, shown in FIG. 1. As shown in FIG. 2, the seat belt retractor 10 includes a housing 14 and a spool 16 supported by the housing 14. A webbing 18 is coupled to, e.g., wound around, the spool 16. As shown in FIGS. 3-8, a webbing engagement member 20 is supported by the housing 14 and is movable from an unlocked position (FIGS. 2-5) to a locked position (FIGS. 7 and 8) engaged with the webbing 18 for preventing movement of the webbing 18 from the webbing engagement member 20. An activating device 22 is slideably supported by the housing 14 and is slideably engageable with the webbing engagement member 20 for moving the webbing engagement member 20 to the locked position.

When the activating device 22 moves the webbing engagement member 20 to the locked position, the webbing engagement member 20 prevents movement of the webbing 18 from the webbing engagement member 20. As such, when in the locked position, the webbing engagement member 20 prevents payout of the webbing 18 from the retractor 10. In the event that slack in the webbing 18 exists on the spool 16, the webbing engagement member 20 prevents the slack from being extended from the spool 16. The webbing engagement member 20 in the locked position separates slack on the spool 16 from the remainder of the webbing 18 extending from the webbing engagement member 20 and across an occupant of the vehicle 12.

With reference to FIG. 1, the vehicle 12 includes at least one seat 24 and each seat 24 includes at least one seat belt assembly 26. Each seat belt assembly 26 includes the seat belt retractor 10, a buckle 28 supported by the seat 24 or another part of the vehicle 12, and a clip 30 on the webbing 18 that selectively engages the buckle. The webbing 18 is extendable from the spool 16 and across the occupant of the seat 24. The clip 30 is engaged with the buckle 28 to lock 80 the webbing 18 across the occupant. When the clip 30 is disengaged from the buckle 28, the spool 16 automatically retracts the webbing 18 onto the spool 16. The spool 16 may be, for example, spring-loaded to retract the webbing 18 onto the spool 16 (e.g., spring-loaded to rotated clockwise to retract the webbing 18 in the position of FIGS. 2 and 3).

With reference to FIG. 2, the retractor 10 includes a housing 14. The housing 14 may include, for example, two walls 32 spaced from each other with an axis of the spool 16 extending between the two walls 32. The housing 14 may be formed of metal or any other suitable material.

The activating device 22 may include a pin 34 slideably engaged with the housing 14. For example, the housing 14 may define a slot 36 that slideably receives the pin 34. The slot 36 guides movement of the activating device 22 relative to the housing 14.

The webbing engagement member 20 may include a pin 38 slideably engaged with the housing 14. For example, the housing 14 may define a slot 40 that slideably receives the pin 38. The slot 40 guides movement of the webbing engagement member 20 relative to the housing 14.

With continued reference to FIG. 2, the retractor 10 may include a pretensioner 42 supported on the housing 14. The pretensioner 42 is activated to rotate the spool 16 to retract the webbing 18 during a sudden deceleration of the vehicle 12, such as during a vehicle impact, to reduce or eliminate slack in the webbing 18 around the occupant. The vehicle 12 may include an impact sensing system (not shown) that senses impact of the vehicle 12, and the impact sensing system may be in communication with the pretensioner 42 to instruct the pretensioner 42 to activate when impact of the vehicle 12 is sensed. As the pretensioner 42 causes the spool 16 to retract the webbing 18, the webbing 18 pulls the occupant against the seat 24. This positions the occupant for impact with inflating front airbags (not shown) and reduces the likelihood that the occupant slides forward under the webbing 18, i.e., reduces the likelihood of "submarining."

Figure 7:
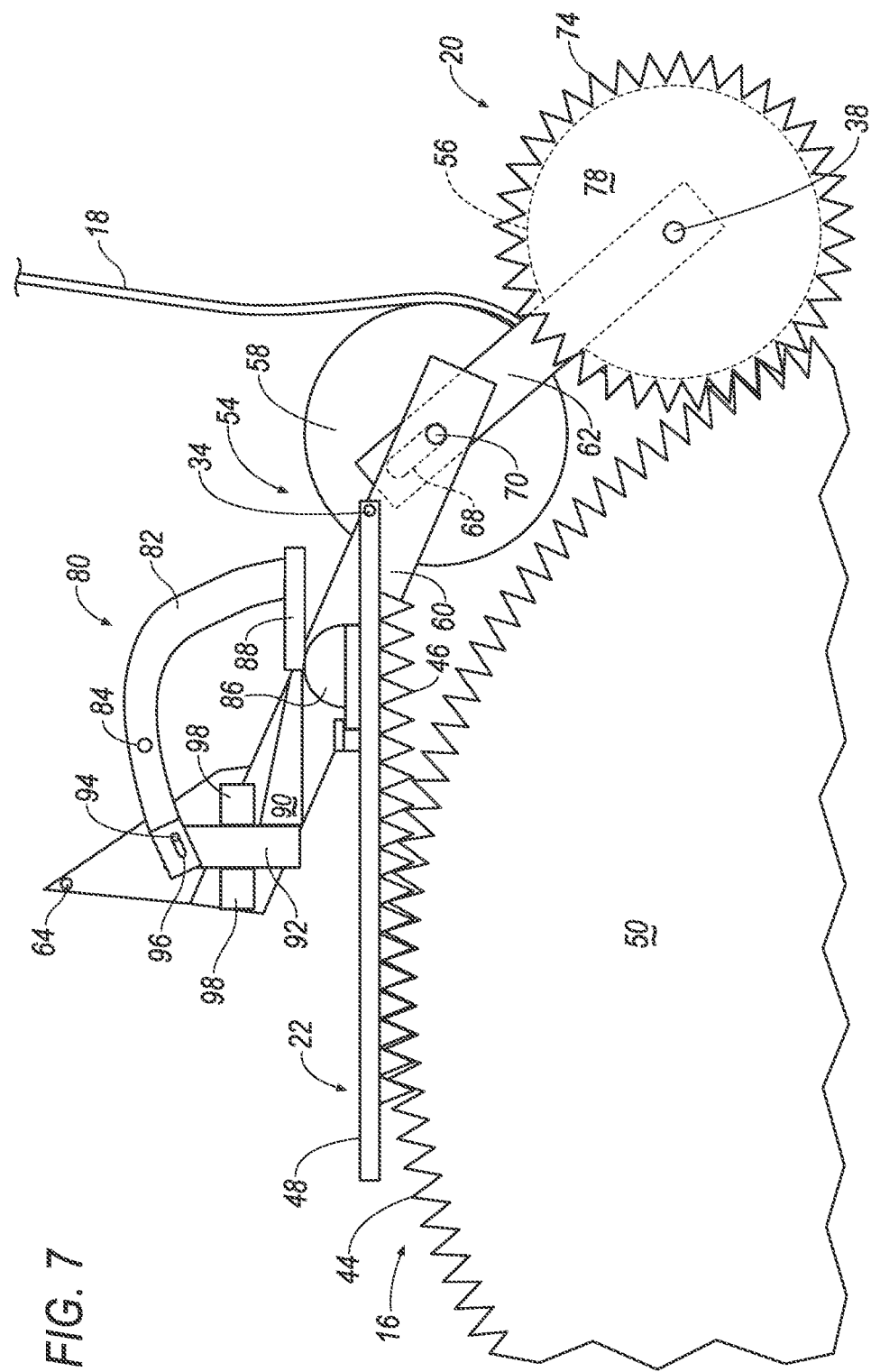
FIG. 7 is a side view of the portion of the seat belt retractor of FIG. 3 with the activating device in the activated position, the webbing locking device in a locked position, and a lock in the locked position.
Figure 8:
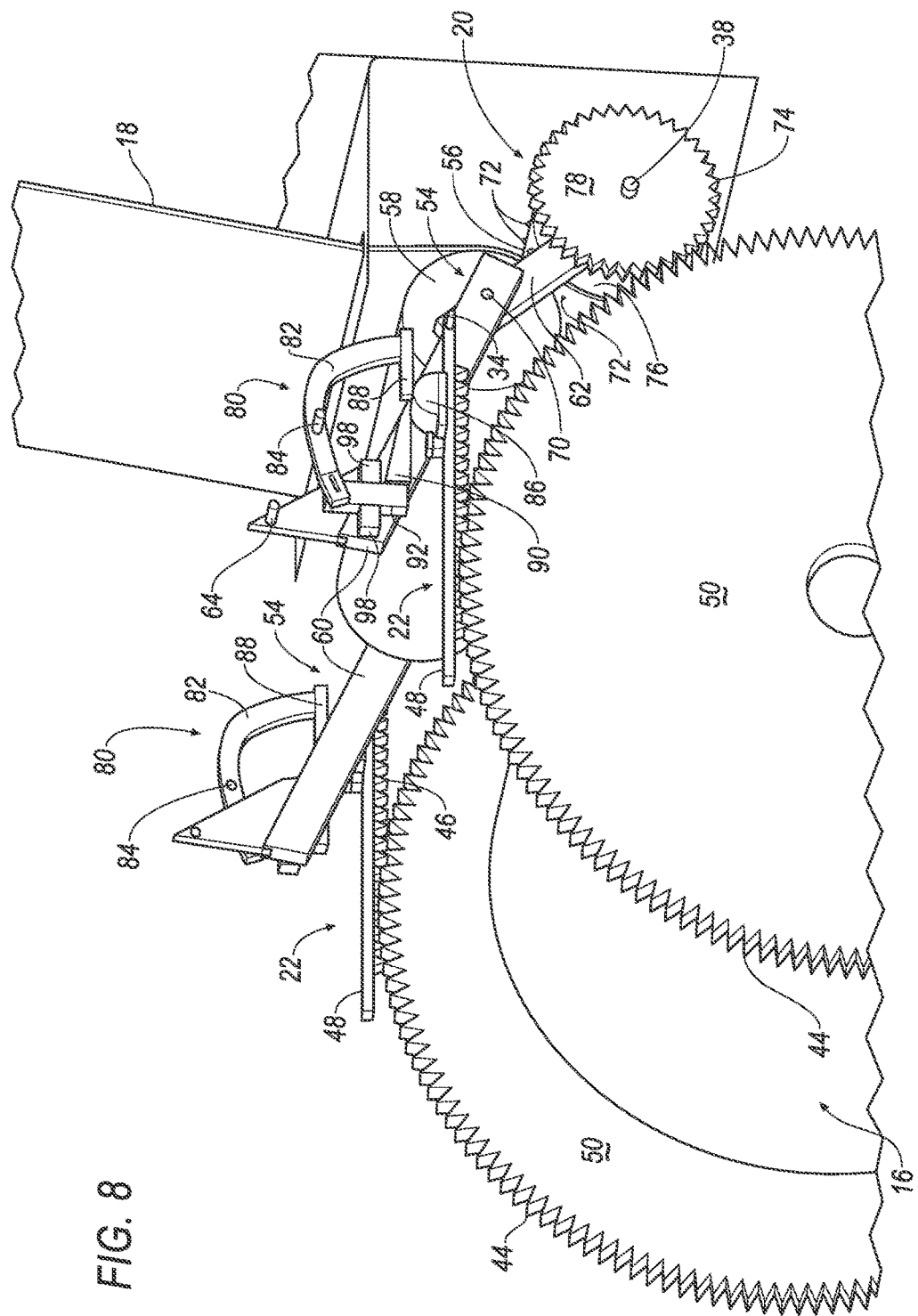
FIG. 8 is a perspective view of FIG. 7.

The pretensioner 42 may include a pyrotechnic actuator (not numbered) supported on the housing 14. The pyrotechnic actuator may be connected to the activating device 22 for moving the activating device 22 from a deactivated position (FIGS. 2-5) to an activated position (FIGS. 7 and 8). For example, gas pressure from the pyrotechnic actuator may be used to move the activating device 22. In the deactivated position, the activating device 22 is disengaged with the webbing engagement member 20, e.g., spaced from the webbing engagement member 20. In the activated position, the activating device 22 is engaged with the webbing engagement member 20 for moving the webbing engagement member 20 to the locked position. A spring 43, shown in FIG. 2, may be disposed between the activating device 22 and the housing 14 to bias the activating device 22 toward the deactivated position that may be overcome by the activation of the pretensioner 42.

The pyrotechnic actuator may enclose a pyrotechnic charge (not shown) that may be ignited by an electric impulse. When the pyrotechnic charge is ignited, the pyrotechnic charge combusts to move components of the pretensioner 42 to rotate the spool 16 to retract the webbing 18 and to move the activating device 22 to the locked position. The pyrotechnic actuator may be of any suitable type and may be connected to the activating device 22 in any suitable manner.

The impact sensing system, as set forth above, may include at least one sensor for sensing full frontal, frontal small overlap, or frontal oblique impact of the vehicle 12, and a controller in communication with the sensor and the pretensioner 42 for activating the pretensioner 42 when the sensor senses such an impact of the vehicle 12. Alternatively or additionally to sensing impact, the impact sensing system may be configured to sense and impending impact prior to the impact, i.e., pre-crash sensing. The sensor may be of any suitable type, e.g., using radar, lidar, and/or a vision system. The vision system may include one or more cameras, CCD image sensors, and/or CMOS image sensor, etc.

The controller of the impact sensing system may be a microprocessor-based controller. The sensor is in communication with the controller to communicate data to the controller. Based on the data communicated by the sensor, the controller instructs the pretensioner 42 to activate.

The controller of the impact sensing system and the sensor may be connected to a communication bus, such as a controller area network (CAN) bus, of the vehicle 12. The controller may use information from the communication bus to control the activation of the pretensioner 42. The pretensioner 42 may be connected to the controller, or may be connected to the communication bus.

Figure 3:
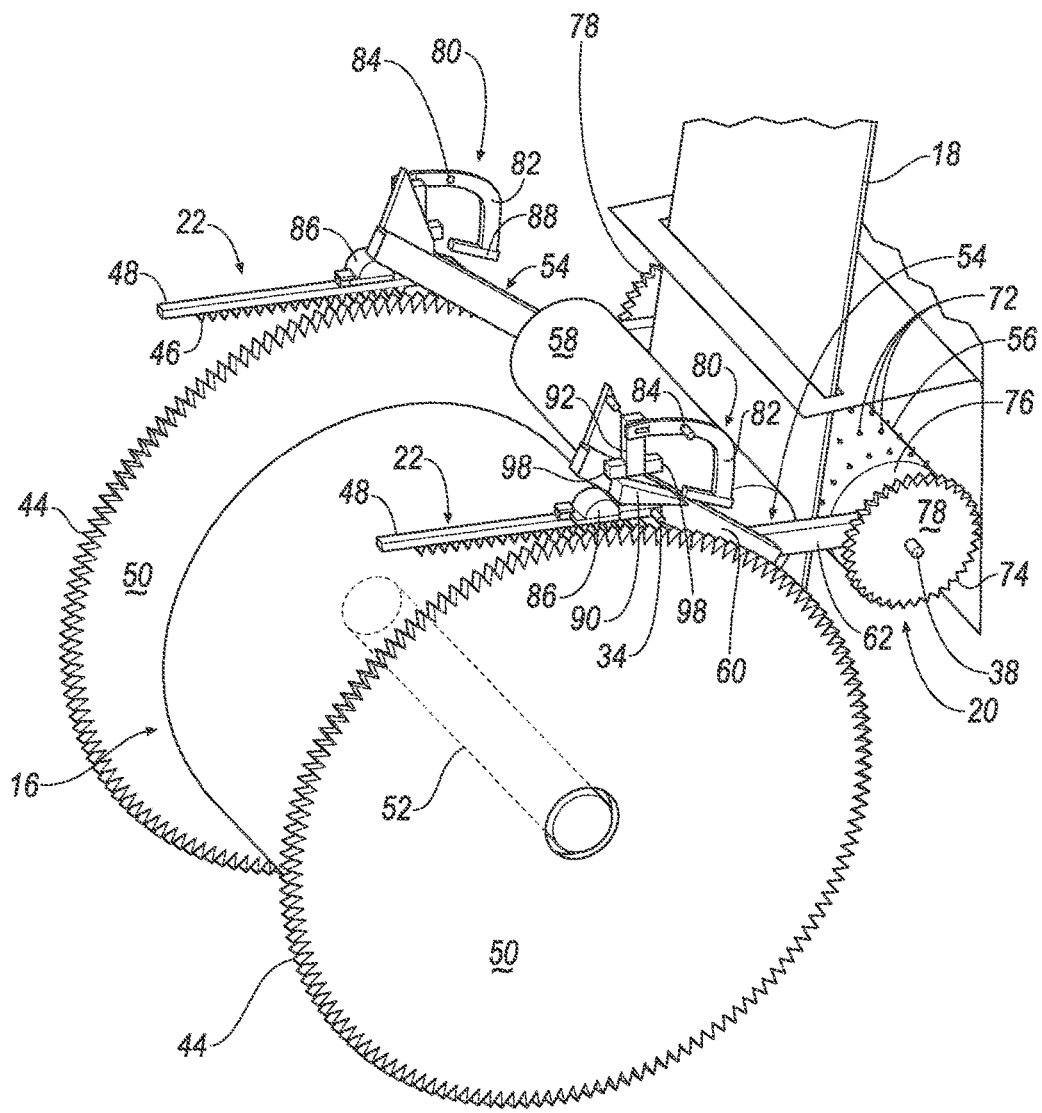
FIG. 3 is a perspective view of a portion of the seat belt retractor including an activating device and a webbing locking device.
Figure 4:
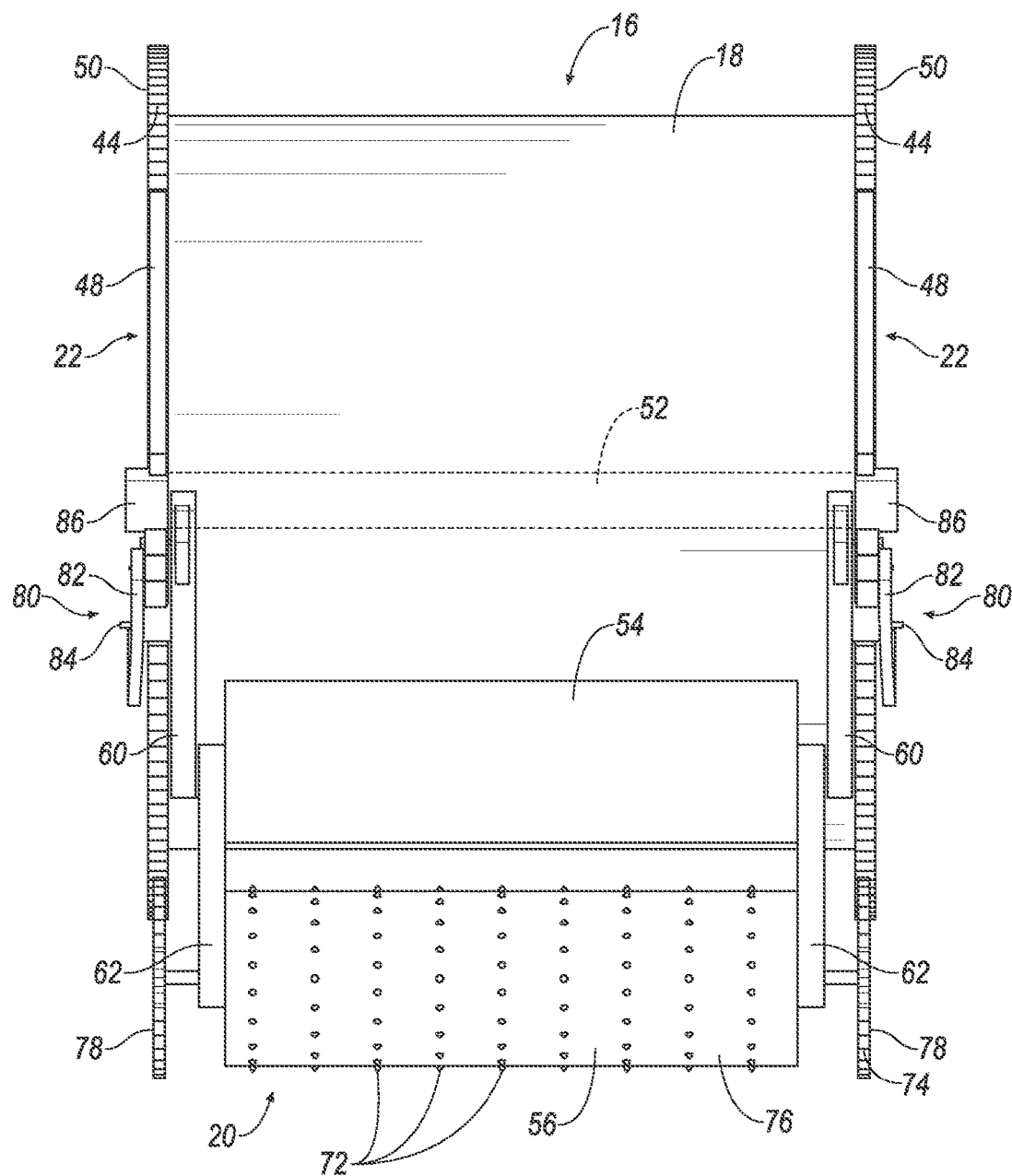
FIG. 4 is a top view of the portion of the seat belt retractor of FIG. 3.

With reference to FIGS. 3-4, the spool 16 includes teeth 44 and the activating device 22 includes teeth 46 configured to engage the teeth 44 of the spool 16. Specifically, the activating device 22 includes a gear rack 48. The spool 16 includes an end plate 50 presenting the teeth 44 engageable with the gear rack 48. Specifically, the spool 16 includes a pair of end plates 50, each presenting the teeth 44 and the retractor 10 includes two activating devices 22 adjacent the pair of end plates 50, respectively. A spindle 52 extends between the end plates 50 and the webbing 18 is wound around the spool 16. One of the end plates 50 supports the pretensioner 42. The pin 34 of the activating device 22 is supported on the gear rack 48. As set forth above, the pyrotechnic actuator is connected to the activating device 22 for engaging the gear rack 48 with the teeth 44 of the spool 16 and sliding the pin 34 along the housing 14 and engaging the gear rack 48 with the teeth 44 of the spool 16.

With continued reference to FIGS. 3-4, the webbing engagement member 20 includes an arm 54 coupled to the housing 14, a roller 56 coupled to the arm 54, and a second roller 58 coupled to the arm 54 with the webbing 18 disposed between the roller 56 and the second roller 58. The arm 54 includes a first segment 60 pivotally supported by the plate of the housing 14 and a second segment 62 pivotally coupled to the first segment 60. The first segment 60 is pivotally supported by the wall 32 at a pivot point, e.g., a pin 64 in a hole 66. One of the first segment 60 and the second segment 62 defines a slot 68 (shown in FIGS. 6-7) and the other of the first segment 60 and the second segment 62 includes a pin 70 slideably engaged in the slot 68.

The second roller 58 is rotatably supported by the first segment 60 and the second segment 62. The second roller 58 supports the pin 70 that engages the slot 68 and the second roller 58 is rotatable about the pin 70 relative to the first segment 60 and the second segment 62.

With continued reference to FIGS. 3 and 4, the first roller 56 is rotatably supported by the second segment 62. The first roller 56 may support the pin 38 that engages the slot 40 in the housing 14. The pin 38 engages the second segment 62 and the roller 56 is rotatable about the pin 38 relative to the second segment 62.

The second roller 58 may be smooth so that the webbing 18 rolls along the second roller 58 when the webbing 18 contacts the second roller 58, as further discussed below. The second roller 58 may move toward the webbing 18 to urge the webbing 18 toward the first roller 56. The first roller 56 may include protrusions 72 that grip the webbing 18 when the webbing 18 is urged against the first roller 56. The protrusions 72 may be sharp to penetrate through the webbing 18, as shown in FIG. 8. Alternatively, the protrusions 72 may have any suitable configuration for gripping the webbing 18 when the first roller 56 contacts the webbing 18.

The webbing engagement member 20 includes teeth 74 configured to engage the teeth 44 of the spool 16. Specifically, the first roller 56 includes teeth 74 configured to engage the teeth 44 of the spool 16. The first roller 56 may include a barrel 76, which presents the protrusions 72, and end plates 78 fixed to the barrel 76 and presenting the teeth 74.

With continued reference to FIGS. 3 and 4, the retractor 10 includes a lock 80 for locking the webbing engagement member 20 in the locked position. The lock 80 is movable from an unlocked position, shown in FIGS. 3-5, to a locked position, shown in FIGS. 7-8. In the unlocked position, the webbing engagement member 20, e.g., the second segment 62 of the arm 54, is free to rotate relative to the housing 14. In the locked position, the webbing engagement member 20, e.g., the second segment 62 of the arm 54, is locked relative to the housing 14 with the webbing 18 engaged with the first roller 56.

The lock 80 may be pivotally supported by the housing 14. For example, the lock 80 may include a lever 82 pivotally supported by the housing 14. The lock 80 may include a pin 84 extending from the lever 82 and engaged with the housing 14, as shown in FIG. 2, such that the lever 82 is pivotally coupled to the housing 14.

With continued reference to FIGS. 3 and 4, the activating device 22 may include a boss 86 on the gear rack 48 slideably engageable with the lever 82. For example, the lever 82 may include a shoulder 88 aligned with the boss 86 such that the boss 86 engages the shoulder 88 as the activating device 22 moves from the deactivated position to the activated position, which moves the lock 80 from the unlocked position to the locked position. The boss 86 and the shoulder 88 may have any suitable shapes that correspond to one another as the boss 86 engages the shoulder 88.

The boss 86 is slideably engageable with the webbing engagement member 20 as the activating device 22 moves from the deactivated position to the activated position. Specifically, the webbing engagement member 20 includes a keeper 90 engageable with the boss 86. The keeper 90 may be fixed to the first segment 60 of the arm 54.

With continued reference to FIGS. 3-4, the lock 80 includes a plunger 92 coupled to the lever 82. The plunger 92 may be engaged with the lever 82 with a pin 94 slideably engaged in a slot 96.

The keeper 90 is engageable with the plunger 92. Specifically, as set forth below, as the activating device 22 moves from the deactivated position to the activated position, the boss 86 of the activating device 22 engages the keeper 90 to rotate the second segment 62 of the arm 54, and then the boss 86 engages the shoulder 88 of the lock 80 to rotate the lever 82 relative to the housing 14. As the lever 82 is rotated, the lever 82 forces the plunger 92 along the keeper 90 to lock 80 the second segment 62 of the arm 54 relative to the housing 14. The lock 80 may include guides 98 fixed, for example, to the housing 14 for receiving the plunger 92 and guiding the plunger 92 as the lock 80 moves from the unlocked position to the locked position.

Figure 5:
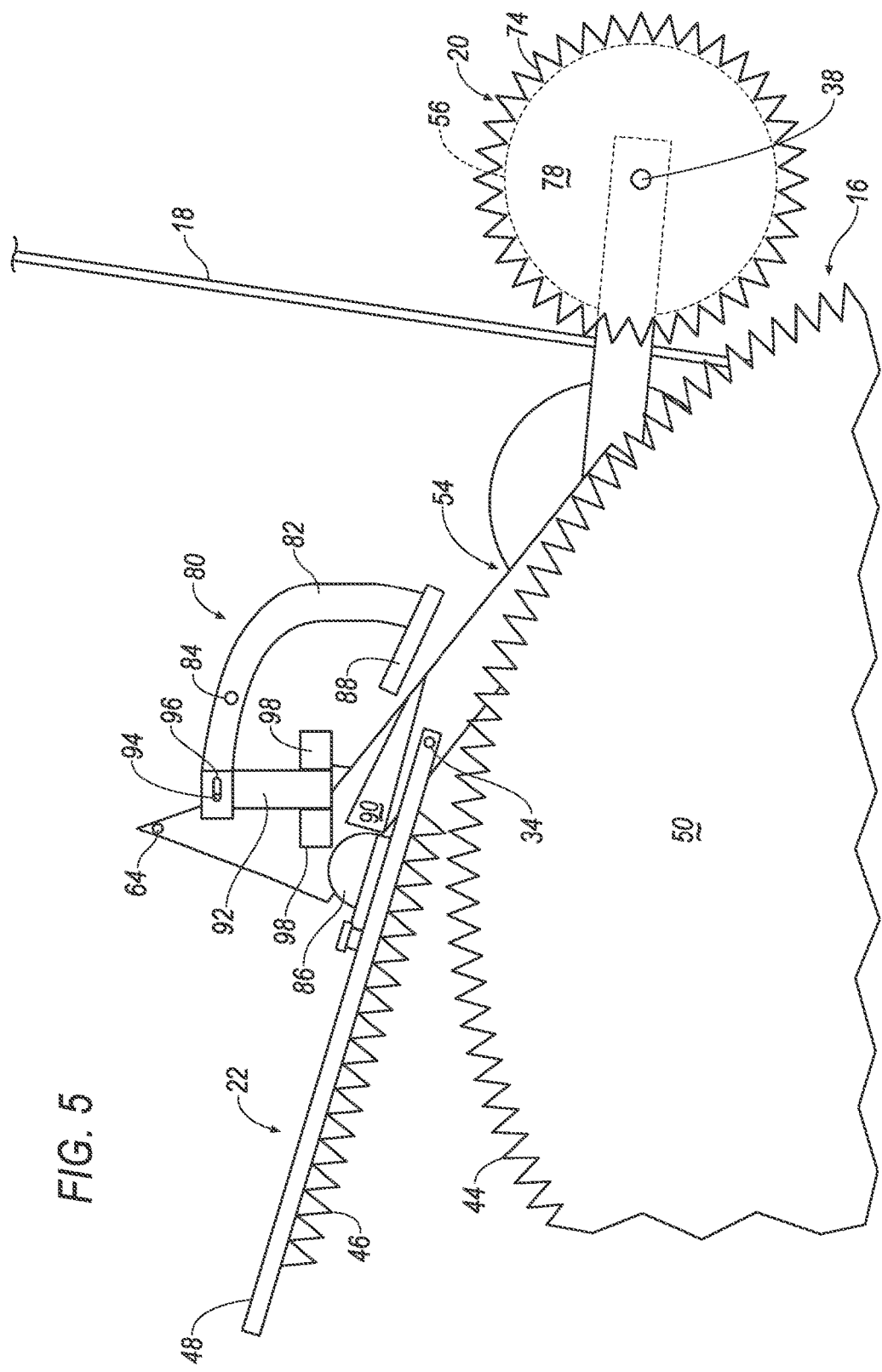
FIG. 5 is a side view of the portion of the seat belt retractor of FIG. 3 with the activating device in a deactivated position and the webbing locking device in an unlocked position.

The operation of the retractor 10 is shown in FIGS. 5-8. In FIG. 5, the activating device 22 is in the deactivated position, the webbing engagement member 20 is in the unlocked position, and the lock 80 is in the unlocked position. In this position, the webbing 18 freely extendable from the spool 16, against the spring-bias of the spool 16, and is automatically retracted onto the spool 16 due to the spring-bias of the spool 16. As shown in FIG. 5, the webbing 18 extends between the first roller 56 and the second roller 58 and may be spaced from both the first roller 56 and the second roller 58.

Figure 6:
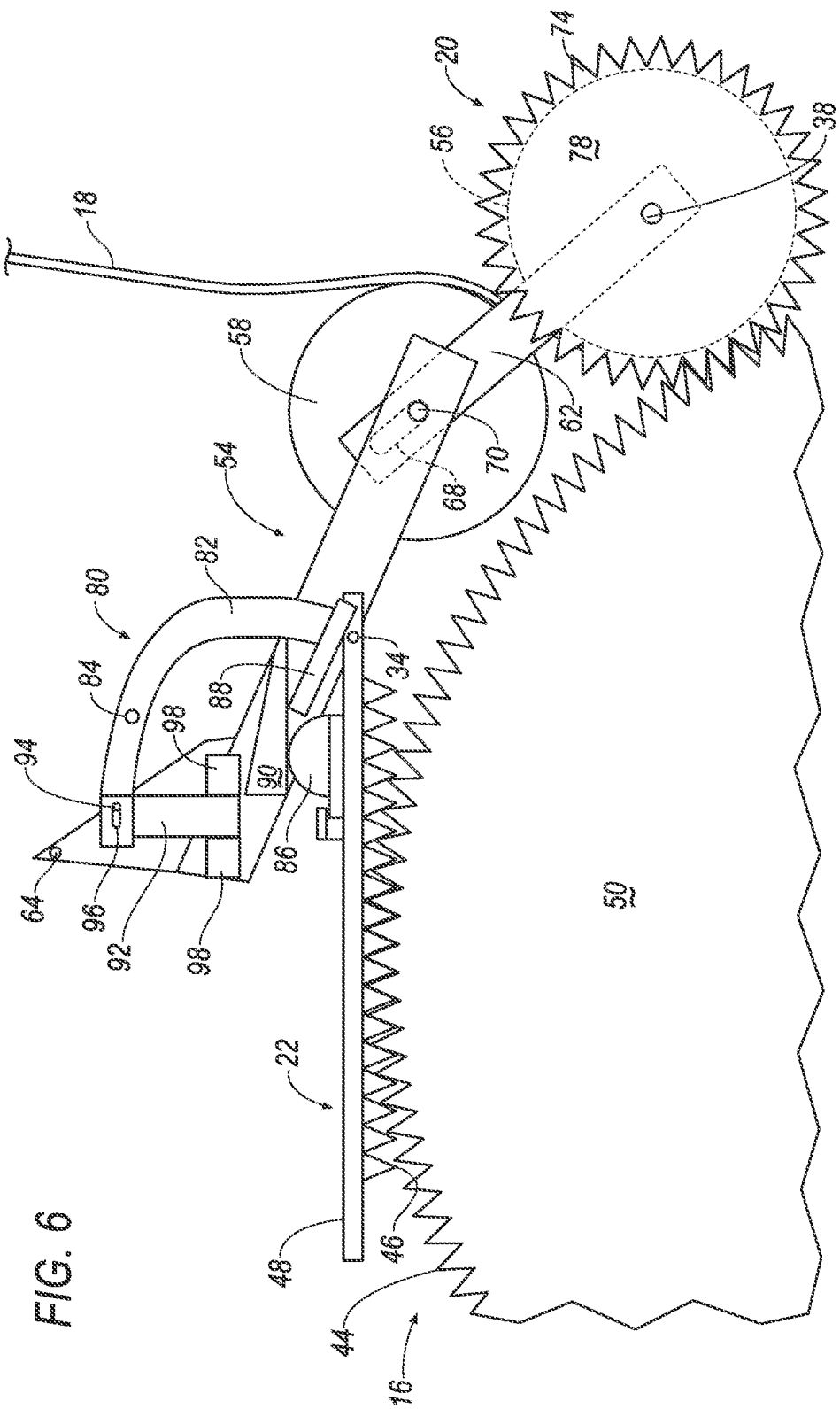
FIG. 6 is a side view of the portion of the seat belt retractor of FIG. 3 with the activating device moving toward an activated position.

In FIG. 6, the activating device 22 is between the deactivated position and the activated position and is moving from the deactivated position toward the activated position under the force of the pretensioner 42, as set forth above. For example, as set forth above, the pretensioner 42 may be activated to rotate the spool 16 to retract the webbing 18 and to move the activating device 22 to the activated position in response to a sensed impact of the vehicle 12.

In FIG. 6, the boss 86 contacts the keeper 90 to rotate both the first segment 60 and the second segment 62 of the arm 54 to move the webbing engagement member 20 to the locked position. Specifically, the boss 86 contacts the keeper 90 on the first segment 60 to rotate the first segment 60 about the pin 64 (e.g., counter-clockwise in FIG. 6), and the first segment 60 rotates the second segment 62 about pin 70 (e.g., clockwise in FIG. 6). As the second segment 62 rotates, the pin 38 rides along the slot 40 and the teeth 74 of the webbing engagement member 20 approach the teeth 44 of the spool 16 until the teeth 74 of the webbing engagement member 20 engage the teeth 44 of the spool 16, as shown in FIG. 6.

In FIGS. 7-8, the lock 80 is in the locked position to prevent movement of the webbing engagement member 20 from the locked position. Specifically, the boss 86 has slideably contacted the shoulder 88 of the lock 80. The boss 86 rotates the lever 82 (e.g., counter-clockwise in FIG. 7) about the pin 84 and, as the lever 82 rotates, the lever 82 drives the plunger 92 along the keeper 90 to lock 80 the keeper 90 in place relative to the housing 14. As such, the engagement between the plunger 92 and the keeper 90 retains the gear rack 48 and the teeth 74 of the webbing engagement member 20 engaged with the teeth 44 of the spool 16 such that the spool 16 is rotationally locked to the housing 14, i.e., cannot rotate relative to the housing 14, and the first roller 56 is rotationally locked to the spool 16, and thus the housing 14. The spool 16 may be mounted to the housing 14 through a rotational load limiting device such as a torsion bar (not shown). In such a case, once the pretensioner 42 is activated during an impact of the vehicle 12, the spool 18 can rotate relative to the housing 14 only if a torque that exceeds the limiting capacity of the torsion bar is applied.

The gear rack 48 has sufficient number of teeth to limit travel of the gear rack 48 only to activate the lock 80 during the activation of the pretensioner 42. After the lock 48 is in the locked position, if the gear rack 48 travels in the opposite direction, the gear rack 48 does not change the position of the lock 80 because the gear rack 48 and the boss 86 are not fixed to the lock 48.

In FIGS. 7 and 8, with the webbing engagement member 20 locks the webbing 18, as set forth above. Specifically, as set forth above, the protrusions 72 engage the webbing 18 to lock 80 the webbing 18 to the first roller 56. Since the first roller 56 is rotationally locked by engagement of the teeth 44, 74, the webbing 18 is locked by the webbing engagement member 20. In other words, the webbing 18 cannot move from the spool 16 beyond the webbing engagement member 20. As such, any slack in the webbing 18 that may be present on the spool 16 is not fed out of the spool 16 after the pretensioner 42 moves the activating device 22 from the deactivated position to the activated position in response to a sensed impact. Since the webbing 18 can be rotated only if the spool 16 can be rotated, there would not be any payout of the webbing 18 as a result of the slack. Payout of the webbing 18 is possible only when a sufficient load is applied to the webbing 18 to generate a torque by the spool 16 to overcome the limiting load capacity of the torsion bar.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat belt retractor comprising:
   a housing;
   a spool supported by the housing;
   webbing coupled to the spool;
   a webbing engagement member supported by the housing and movable to a locked position engaged with the webbing for preventing movement of the webbing relative to webbing engagement member; and
   an activating device slideably supported by the housing and slideably engageable with the webbing engagement member for moving the webbing engagement member to the locked position;
   wherein the spool includes teeth and the activating device includes teeth configured to engage the teeth of the spool; and
   wherein the webbing engagement member includes teeth configured to engage the teeth of the spool.

2. The seat belt retractor as set forth in claim 1 further comprising a pyrotechnic actuator connected to the activating device.

3. The seat belt retractor as set forth in claim 1 wherein the webbing engagement member includes an arm coupled to the housing and a roller coupled to the arm.

4. The seat belt retractor as set forth in claim 3 wherein the roller includes the teeth of the webbing engagement member.

5. The seat belt retractor as set forth in claim 3 wherein the roller includes protrusions for engaging the webbing.

6. The seat belt retractor as set forth in claim 3 further comprising a second roller coupled to the arm with the webbing disposed between the roller and the second roller.

7. The seat belt retractor as set forth in claim 1 further comprising a lock for locking the webbing engagement member in the locked position.

8. The seat belt retractor as set forth in claim 7 wherein the lock is pivotally supported by the housing.

9. The seat belt retractor as set forth in claim 7 wherein the lock includes a lever pivotally supported by the housing and a plunger coupled to the lever, and wherein the activating device includes a boss engageable with the lever.

10. The seat belt retractor as set forth in claim 9 wherein the webbing engagement member includes a keeper engageable with the boss and the plunger.

11. The seat belt retractor as set forth in claim 1 wherein the housing defines an elongated slot and the activating device includes a pin slideably engaged with the slot.

12. The seat belt retractor as set forth in claim 1 wherein the housing defines a slot and the webbing engagement member includes a pin engaged with the slot.

13. The seat belt retractor as set forth in claim 1 wherein the activating device includes a gear rack and a pin slideably engaged with the housing.

14. The seat belt retractor as set forth in claim 13 wherein the teeth of the spool are engageable with the gear rack.

15. The seat belt retractor as set forth in claim 14 further comprising a pyrotechnic actuator connected to the activating device for sliding the pin along the housing and engaging the gear rack with the teeth of the spool.

16. The seat belt retractor as set forth in claim 15 wherein the activating device includes a boss on the gear rack slideably engageable with the webbing engagement member.

17. A seat belt retractor comprising:
a housing;
a spool supported by the housing;
webbing coupled to the spool;
a webbing engagement member supported by the housing and movable to a locked position engaged with the webbing for preventing movement of the webbing relative to webbing engagement member; and
an activating device slideably supported by the housing and slideably engageable with the webbing engagement member for moving the webbing engagement member to the locked position;
wherein the webbing engagement member includes an arm coupled to the housing and a roller coupled to the arm; and
wherein the roller includes protrusions for engaging the webbing.

18. The seat belt retractor as set forth in claim 17 further comprising a pyrotechnic actuator connected to the activating device.

19. A seat belt retractor comprising:
a housing;
a spool supported by the housing;
webbing coupled to the spool;
a webbing engagement member supported by the housing and movable to a locked position engaged with the webbing for preventing movement of the webbing relative to webbing engagement member;
an activating device slideably supported by the housing and slideably engageable with the webbing engagement member for moving the webbing engagement member to the locked position; and
a lock for locking the webbing engagement member in the locked position;
wherein the lock includes a lever pivotally supported by the housing and a plunger coupled to the lever, and wherein the activating device includes a boss engageable with the lever.

20. The seat belt retractor as set forth in claim 19 wherein the lock includes a lever pivotally supported by the housing and a plunger coupled to the lever, and wherein the activating device includes a boss engageable with the lever.

* * * * *